United States Patent
Young et al.

(10) Patent No.: US 10,792,587 B2
(45) Date of Patent: Oct. 6, 2020

(54) METHOD FOR AERATION OF A FLAMMABLE LIQUID TO EXTRACT FLAMMABLE VAPOR

(71) Applicant: TERRA PRIMORIS HOLDINGS, LLC, Prescott Valley, AZ (US)

(72) Inventors: Gregory E. Young, Prescott Valley, AZ (US); Zane A. Miller, Loganville, GA (US)

(73) Assignee: TERRA PRIMORIS HOLDINGS, LLC, Prescott Valley, AZ (US)

( * ) Notice: Subject to any disclaimer, the term of this patent is extended or adjusted under 35 U.S.C. 154(b) by 0 days.

(21) Appl. No.: 16/246,096

(22) Filed: Jan. 11, 2019

(65) Prior Publication Data
US 2019/0143245 A1 May 16, 2019

Related U.S. Application Data

(63) Continuation-in-part of application No. PCT/US2017/041581, filed on Jul. 11, 2017.
(Continued)

(51) Int. Cl.
*B01D 5/00* (2006.01)
*C10L 1/08* (2006.01)
(Continued)

(52) U.S. Cl.
CPC ............... *B01D 5/006* (2013.01); *B01D 1/16* (2013.01); *B01D 5/00* (2013.01); *C10G 7/00* (2013.01); *C10G 7/04* (2013.01); *C10L 1/08* (2013.01)

(58) Field of Classification Search
CPC . B01D 5/006; B01D 5/00; B01D 1/16; C10G 7/00; C10G 7/04; C10L 1/08
(Continued)

(56) References Cited

U.S. PATENT DOCUMENTS

| 3,616,779 A | * | 11/1971 | Newkirk | ............ | F02M 21/0224 |
| | | | | | 123/41.86 |
| 3,790,368 A | | 2/1974 | Olsson et al. | | |

(Continued)

FOREIGN PATENT DOCUMENTS

WO    WO 79/00909 A1   11/1979
WO    WO 2016/209741   12/2016

OTHER PUBLICATIONS

Pors et al., "Optimised Mixture Formation for Diesel Fuel Processing", Fuel Cells (online), Apr. 2008, vol. 8, Issue 2, pp. 129-137, see entire document, especially Abstract; Fig. 1; p. 130, col. 1, para 3; p. 130, col. 1, para 6; p. 131, col. 1, para 2.

*Primary Examiner* — Mahmoud Gimie

(74) *Attorney, Agent, or Firm* — Bycer Law, PLC; Matthew L. Bycer

(57) ABSTRACT

A system and method for improving hydrocarbon fuel, such as diesel, particularly after contamination in underground storage tanks with other fuels such as gasoline, etc. High-gravity hydrocarbons present in diesel and/or water are removed via aeration of the (out-of-specification/contaminated) diesel. The removal of unwanted hydrocarbons and other contaminants can be accomplished in a number of fashions, including pumped air, exposure of the line, drawing of air into the line, etc. After removal from the diesel line, high-gravity hydrocarbons can be isolated and recycled or re-used, for instance to power the system. Following the conditioning, the diesel may be returned into specification for dispensation at a commercial or retail fuel center for use in vehicles and diesel combustion engines. The system and process may be portable and/or conducted locally at the site of an underground storage tank.

20 Claims, 7 Drawing Sheets

Related U.S. Application Data

(60) Provisional application No. 62/360,958, filed on Jul. 11, 2016.

(51) Int. Cl.
 *C10G 7/04* (2006.01)
 *B01D 1/16* (2006.01)
 *C10G 7/00* (2006.01)

(58) Field of Classification Search
 USPC .......................................................... 123/434
 See application file for complete search history.

(56) References Cited

U.S. PATENT DOCUMENTS

| | | | | |
|---|---|---|---|---|
| 3,800,533 | A | * | 4/1974 | Zankowski ............... F01N 3/08 60/274 |
| 3,977,972 | A | | 8/1976 | Bloch et al. |
| 4,011,847 | A | * | 3/1977 | Fortino ................... F02M 13/02 123/522 |
| 4,409,946 | A | * | 10/1983 | Sandford ............... F02M 31/18 123/523 |
| 4,450,820 | A | * | 5/1984 | Haynes ................. F02D 33/006 123/514 |
| 5,423,979 | A | | 6/1995 | Allen |
| 5,522,368 | A | * | 6/1996 | Tusino ................... F02M 17/22 123/27 GE |
| 5,765,537 | A | * | 6/1998 | Coleman ............ F02M 25/0228 123/514 |
| 5,904,190 | A | * | 5/1999 | Patel ........................ A62C 3/06 141/198 |
| 5,996,562 | A | | 12/1999 | Plog et al. |
| 6,095,101 | A | * | 8/2000 | Pedersen .................. F02B 7/02 123/27 GE |
| 9,364,773 | B2 | | 6/2016 | Morris |
| 2006/0150631 | A1 | | 7/2006 | Smith et al. |
| 2007/0241033 | A1 | | 10/2007 | Stephenson |
| 2008/0128048 | A1 | * | 6/2008 | Johnson ................. B64D 37/32 141/59 |
| 2009/0242038 | A1 | | 10/2009 | Sengupta et al. |
| 2014/0238349 | A1 | | 8/2014 | Harle et al. |
| 2016/0045841 | A1 | | 2/2016 | Kaplan et al. |
| 2016/0053190 | A1 | | 2/2016 | Middleton et al. |
| 2017/0038238 | A1 | * | 2/2017 | Nguyen .................. G01F 22/02 |

\* cited by examiner

METHOD FOR AERATION OF A FLAMMABLE LIQUID TO EXTRACT FLAMMABLE VAPOR

CLAIM OF PRIORITY

The present application includes subject matter disclosed in and claims priority to PCT application entitled "Method for Aeration of a Flammable Liquid To Extract Flammable Vapor" filed Jul. 11, 2017 and assigned Serial No. PCT/US17/041581, and provisional application entitled "Method for Aeration of a Flammable Liquid To Extract Flammable Vapor" filed Jul. 11, 2016 and assigned Ser. No. 62/360,958, describing an invention made by the present inventors.

BACKGROUND OF THE INVENTION

1. Field of the Invention

The present invention is related to refining of hydrocarbon fuels. More particularly, it is related to a method for distilling diesel fuel and related hydrocarbon vapors.

2. Description of Prior Art

As is known in the art, many diesel fuels include a mixture of hydrocarbons, typically with boiling points in the range of 100-380 degrees Celsius under certain pressure conditions. Diesel fuel is typically obtained from petroleum or petroleum crude oil. Crude oils include three major classes of hydrocarbons, alkanes, cyclo-alkanes, and aromatic hydrocarbons. Thin, low density particles, otherwise known as "high gravity" hydrocarbons, or some known as high API (American Petroleum Institute) gravity, can be easily separated from thick high density or "low gravity" hydrocarbons. Those high gravity fuels typically off-gas, or vaporize, more readily under any conditions, and will substantially off-gas at standard pressure or 1 Atm.

Diesel is composed of about 75% alkanes and 25% aromatic hydrocarbons. Refinery of diesel typically includes a distillation procedure (often operating under atmospheric pressure). Materials and components that are too heavy to vaporize in atmospheric distillation are separated from high gravity hydrocarbons, often small chain or otherwise light. Even after fuel is derived from crude oil, downstream conversion processes can separate out and improve formulations of fuel. Fuels can be upgraded or improved through processing in a variety of methods as are known in the art. Diesel is made up of a number of hydrocarbon components. Diesel is known as a fuel including a range of specific molecular compositions that reacts favorably in diesel combustion engines. Specific flashpoints, cetane levels, and other specifications are required for a saleable diesel product. When diesel degrades, or is otherwise polluted with impurities, or accidentally mixed with other grades of fuel, it may no longer meet specifications for flashpoint, etc. Spoiled fuel may need improvement to return to diesel fuel. Otherwise, the fuel will go to waste. Currently when diesel fuel is adulterated, the fuel may not be able to serve its purpose and therefore be inadequate for diesel, gasoline, or other combustion needs. In the retail gasoline/diesel fuel stations, contaminated fuel tanks pose a problem. Typically stored in underground or aboveground storage tanks, the fuel must be pumped out of the contaminated tank into a tanker truck, transported offsite, and sold or further refined for use. The cost of the transportation, the delays involved, and the often low price for recovery (or cost to dump) leads to a financial loss to the retail service station or the transportation company that delivered the fuel.

A major consideration in the design of bulk fuel and lubricating fluid storage tanks is the purity of the product stored. A region at the bottom of fuel or product storage tank may allow debris and water to settle from the product being stored. Fuel storage systems also contain strainers and filters that monitor and or prevent large debris, sediment and water respectively, from entering the fueling delivery system and or consumer's vehicle or equipment. Diesel, kerosene and lubricating fluids in bulk storage for example can absorb moisture which often enters the fuel tank ullage empty vapor space through the vent riser at the top of the tank. In many circumstances, dissolved water (moisture), to a regulated degree, is not considered to be a major contaminant, and may be vaporized during combustion. During temperature and pressure fluctuations however, moisture can separate from the solution forming a precipitate or a water-in-fuel emulsion: small water droplets suspended in the fuel. Separated water is a contaminant and can cause several problems.

Due to the relatively greater density of water, these droplets gradually drop to the bottom of the tank and form a separate layer. The time of this settling process, as determined by the water and fuel density, viscosity and size of the water droplet and temporal condition can range from minutes to weeks. Such unpredictable and possible lengthy timescales are or can be unacceptable.

The main protocol for reducing the amount of moisture entering the fuel and/or storage tank is to reduce empty space in the tank (ullage), and to monitor and control the moisture in the ullage. Reducing the size of the ullage, and therefore, the amount of water vapor that can be dissolved into the fuel could be considered unreliable, as the fuel can also be contaminated with water during production and transport.

A common issue occurs where diesel is mixed with other fuels or otherwise contaminated with gasoline and other hydrocarbon fuels. The diesel may be mixed with any liquid that is not beneficial to the fuel integrity. This can occur when a tank is repurposed where it was once storing gasoline and then later used to store diesel fuel. This can also occur when fuel lines are repurposed for diesel after use with gasoline, whereby gasoline is left in the valves and pipes. Sometimes, refill errors occur in fueling, whereby excess fuel is inappropriately filled into the wrong tank. When diesel is contaminated with lighter hydrocarbons such as those found in gasoline, the flashpoint of the fuel lowers. When this occurs, the diesel fuel in a combustion engine becomes a great safety danger. The mixed fuels create an explosive atmosphere in the diesel tank. Low vapor pressure and low density vapors are required to keep diesels safe. When gasoline is placed into a diesel engine, the vapors create a danger and may otherwise prevent the operation of the diesel combustion engine.

Therefore, it is an object of the present invention to provide for a method for improving diesel fuels that have been contaminated and/or otherwise mixed with other fuels and/or liquids.

It is another object of the present invention to provide for a method to separate out high gravity hydrocarbons that negatively impact diesel fuels' ability to meet specifications.

It is yet another object of the present invention to improve fuel contaminated with liquids.

It is a yet further object of the present invention is to provide for a method for correcting a deficiency in a diesel fuel.

It is a yet another object of the present invention to provide for a process for separating diesel from contaminated gasoline fuels.

It is still another object of the present invention to provide for a process for recovering diesel fuel after contamination by gasoline.

It is as yet a further object of the present invention to provide for local fuel reconditioning.

It is yet a further object of the present invention to provide for a system for recovering diesel fuel after contamination with gasolines.

These and other objects of the present invention will become apparent to those skilled in the art as the description thereof proceeds.

SUMMARY OF THE INVENTION

The present invention includes a method for treating diesel that was contaminated with gasoline or other light hydrocarbons (high gravity fuels). The present invention also includes removal of liquid contamination of fuels based on the vapor pressure gradient. Water and other liquid contaminants (precipitated, emulsified, or even combined) may be removed by movement of a vapor/gas through the fuel. The present invention is preferably used in underground storage tanks, but may be used in other hydrocarbon fuels storage tanks typically used with diesel fuel. Diesel fuel may include bio-diesel, synthetic diesel, and other fuels useful in diesel combustion engines.

A first step of the process of aerating the fuel may include the inerting of the tank ullage with a nitrogen gas, carbon dioxide gas and/or carbon monoxide gas in order to ensure the safety during the process. A pump may supply pressure to run fuel out of the tank in a solid column whereby the fuel is pumped up and out of an underground storage tank, returned, and released down into the gaseous ullage of the tank. The fuel is dropped back into the remaining fuel stored in the tank. In this method, the fuel is exposed to the gases of the ullage, as described above, or ambient air, or specialized gas/air, or nitrogen enriched air, whereby high gravity particles (such as hydrocarbons, or water, etc.) separate from heavier fuel hydrocarbon. This method raises a great concern for safety by static discharge as sparks can ignite when dropping fuel from the outlet of a pump pipe into a store of fuel. In addition, fuel can be heated within the pump system, or through a separate heating element, in order to facilitate the release of high gravity particles. The fuel may be dropped over the ullage and vaporized and/or evaporated. The fuel may run from a high pressure within the outlet of the pump pipeline, and then released into a low pressure system, such as the ullage, in order to release gas vapor or water vapor. Vapor can leave through the ullage through a vent system which may further capture the high gravity hydrocarbon vapors as they leave the tank or otherwise be released into the atmosphere. Hydrocarbon vapors can be recovered for other uses. Diesel contaminated with gasoline may be improved to diesel in this method. An alternative method may cause the water or other contaminants to be removed from the fuel to improve the fuel (gasoline, diesel, other hydrocarbon fuels, or otherwise).

The pump typically will run for some time in order to cycle through at or at least fifty percent (50%) of the fuel, or more typically the entirety of the fuel in the tank, and most preferably at least twice the volume of the fuel in the tank will cycle through. The method includes a means for increasing the weight of a diesel fuel by removing lighter hydrocarbons.

The present invention also includes a method for distilling high gravity vapors out of a diesel fuel store whereby the fuel is aerated to release gasoline or other high gravity hydrocarbon vapors along with the air that is pumped through the fuel store. When the air includes oxygen, that oxygen acts as an oxidizer, similar to how the atmosphere oxidizes many hydrocarbon vapors and gases. Another method may be to draw the diesel through a pump using the kinetic energy of the moving diesel fuel to draw in air from atmosphere or other gas source into the moving diesel within a pump whereby the hydrocarbon vapors separate out in the pipe and can be separated at a later point, for instance (just prior to or) when the pipe discharges back into the tank. The present invention also includes a method for increasing the weight of a hydrocarbon fuel source via distillation as is described herein.

Another aspect of the present invention includes a system and method for aerating diesel fuel from an underground storage tank in order to remove high gravity hydrocarbons. This method raises the flashpoint of the diesel fuel for use in a diesel combustion engine. A pump draws fuel out of the underground storage tank in a solid column and deposits that fuel into a secondary tank. The secondary tank includes an opening to allow air or other gases to be pumped into and through the tank and the fuel stored therein. The secondary tank includes another opening, preferably at the top, to vent out the air and hydrocarbon vapors. The secondary tank is then used to refill the underground storage tank, preferably through a solid column of fuel in a pipe returning into the tank to be deposited below the fuel level in order to prevent any risk for spark or other agitation of the fuel such as splashing.

The vented vapor and gas may be used in a number of optional ways including condensed back into some kind of fuel. For instance, vented substance may include propane, butanes, heptanes, or methane that can be useful as fuels for other purposes. Such other purposes may be to power the pump and distillation process. Another use may be merely to vent the vapor and gas into the atmosphere. A thermal burner or oxidizer may be placed along the vent in fluid communication with such vent, in order to burn of the excess fuel gases. Another possible use is to run the fuel through a charcoal scrubber as a method for light hydrocarbon vapor recovery in process, which can provide and value return.

Another aspect of the present invention includes a system and method for aerating a fuel from a storage tank in order to remove high gravity particles. Another aspect of the invention is to remove alterants, or contaminants (such as water) that can be captured and transported along with a gaseous material. A pump draws fuel out of the underground storage tank in a solid column and deposits that fuel into a secondary tank. The secondary tank includes an opening to allow air or other gases to be pumped into and through the tank and the fuel stored therein. Nitrogen enriched air (NEA) may be used to transport the water vapor molecules. The secondary tank includes another opening, preferably at the top, to vent out the air and hydrocarbon vapors. The secondary tank is then used to refill the underground storage tank, preferably through a solid column of fuel in a pipe returning into the tank to be deposited below the fuel level in order to prevent any risk for spark or other agitation of the fuel such as splashing.

The improved fuel, after the method for improving the fuel has been run for a certain length of time, can be drawn from the underground storage tank and tested in a diesel combustion engine. The diesel combustion engine may be part of a light or heavy vehicle engine with onboard sensors and computer. The light vehicle may be a truck, for instance, a truck housing the pump and possibly the secondary tank with aeration system and pipes used for the distillation method. When running the improved diesel through the truck engine, sensors on the truck provide a readout through the onboard CPU (centralized processing unit) giving diagnostic conditions of the fuel and the operation of the engine. CPU readouts include information on oxygen, temperature of the exhaust etc. as are known in the art. Information on ETO (exhaust temperature output), oxygen, RPM, fuel injection rates, sulfide outputs, etc. provide feedback as to the quality of the fuel. Using a known appropriate diesel fuel, the truck can be calibrated, and then when the improved diesel product is run through the engine in a diluted state at first or through several concentrations of diluted states to ascertain fuel quality without comprising the engine integrity, a comparison can be made to determine whether or not the improved diesel has met specifications. The diesel fuel can be further tempered with additional boosts such as a cetane boost, or otherwise in order to meet diesel fuel specifications.

BRIEF DESCRIPTION OF THE DRAWINGS

The present invention will be described with greater specificity and clarity with reference to the following drawings, in which.

DETAILED DESCRIPTION OF THE PREFERRED EMBODIMENT

Figure 1:
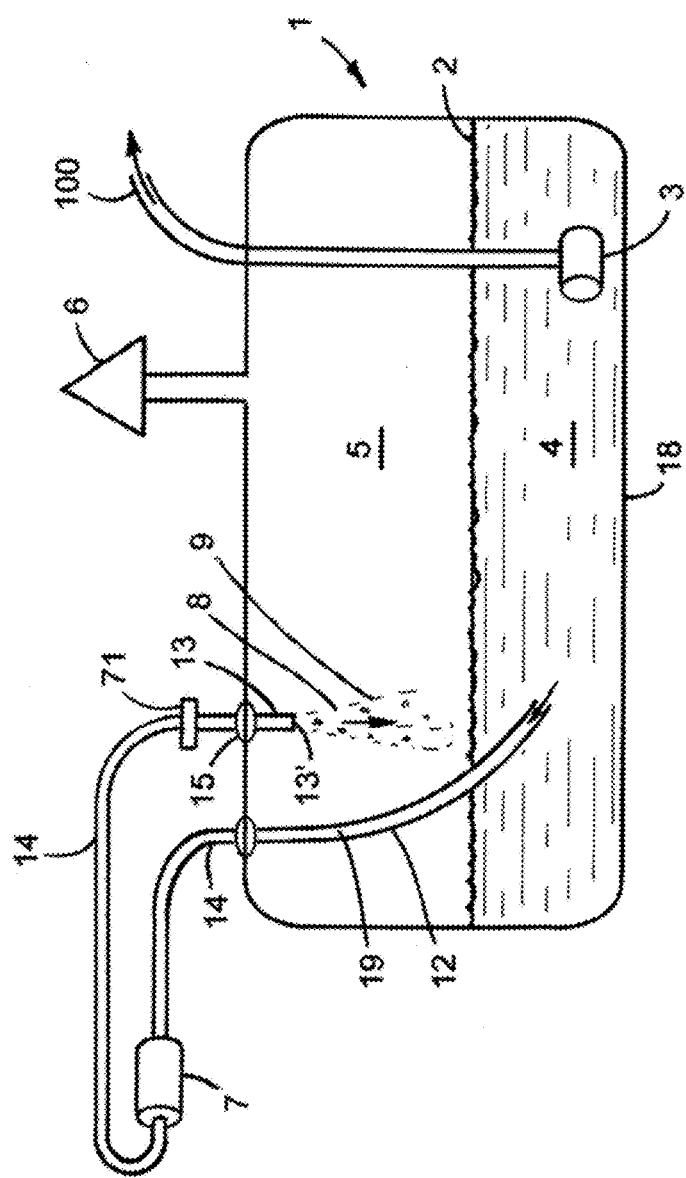
FIG. 1 illustrates a cross-sectional schematic view of the tank and aeration system of the present invention.

The present invention includes a method and system for treating and improving a variety of diesel fuels (e.g. biodiesel, etc.). Most commonly, this invention is used to improve diesel that is contaminated with gasoline, or other high gravity hydrocarbons, thus making the diesel out of specifications, and no longer usable as diesel fuel to be sold at retail gas stations and/or otherwise make it unfit for use in a diesel combustion engine. The diesel is distilled in such a fashion that the high gravity hydrocarbons are removed. The vapor pressure of the high gravity hydrocarbons causes them to exit the liquid fuel and separate from the liquid fuel, leaving behind heavier, low-gravity, typically long-chain carbon molecules, that are more appropriate for diesel fuels. The vapors exit the liquid fuel via vapor pressure into a surrounding gaseous region, such as ambient air or inerted gases, etc. When releasing the high pressure from the liquid fuel, vapor pressure causes the high gravity hydrocarbons to exit more quickly.

In one embodiment, the fuel is basically lifted out of the tank and returned while being exposed to air. The fuel can be exposed to air via a Venturi air inlet. The fuel can also be exposed to air in the ullage of the tank, or otherwise. Heating of the liquid fuel can also be beneficial to cause the vapor pressure of high gravity hydrocarbons to exceed the ambient atmospheric pressure. When heated, the hydrocarbons leave at a faster rate.

One question is how to deal with the exiting high gravity hydrocarbon vapors. Exiting hydrocarbon vapors can be used in a number of means. They can be recovered, vented, burnt off, scrubbed, or condensed/consumed for use in the system. The cycle time for running the diesel distillation can be upwards of multiple hours. Typically on a 20,000 or 30,000 gallon underground storage tank at a retail fuel dispensary, as is known in the art, in order to cycle through tens of thousands of gallons of diesel at an appropriate pace for distillation runs 4-8 hours. A good amount, if not the entire volume of the fuel, should run through the aeration system. Depending on the level of contamination, the fuel may run through its entire volume more than once, including twice or more.

During the distillation and improvement process, or aeration method, the fuel continues to improve. Starting at a very fast rate of improvement (as large volumes of high gravity hydrocarbon vapors exit quickly), as the fuel nears a more stable diesel the hydrocarbon off-gasing slows. During the improvement process, the fuel can be tested to determine if the process is completed or if further processing is required. Typically the fuel must meet a flashpoint test to ensure that the diesel does not create a dangerous atmosphere in the ullage (empty space) of the storage tank or prematurely ignite within a diesel engine. Another attribute of the fuel is the cetane level, which must meet standards. In order to test the fuel, a sample may be taken and put into a standard diesel combustion engine, preferably one with an advanced sensor system. As is known in the art, many standard vehicles include an elaborate sensor system and computer with centralized processing unit (CPU). On-board vehicle computers can run a diagnostic on the fuel. By calibrating the vehicle engine with an acceptable control diesel fuel, the addition of improved diesel fuel into the tank can determine whether the improved diesel is up to spec. In this process, one can determine an underperforming fuel from an acceptable fuel. On-board vehicle CPU diagnostics can determine the oxygen level of the exhaust, the temperature of exhaust, and other aspects of the running of the fuel. By comparing the performance of the vehicle with and without a portion of the improved fuel added to the vehicle fuel tank, one can determine whether or not the process is complete and/or working. Other items for which the on-board CPU can test includes features known in the art to indicate fuel efficiency and composition, such as fuel injection rates, revolutions per minute, sulfide content, etc. Once the engine runs within manufacturing tolerance, it is determined that the fuel can be safe for use. Further chemical analysis tests may be run to ensure that fuel is up to specifications for retail dispensation. To avoid damage to the engine, only a small sample of the processed fuel will be added to a larger volume of standard diesel already present in the vehicle fuel tank. This is done to avoid damage to the engine from a poor quality fuel. Other means of testing the fuel include running through meter band IFR, spectrometer, hydrometer (to test density), etc. However, the vehicle on-board engine system is by far the most convenient and effective means of determining whether or not the fuel will run in a diesel combustion engine.

When treatment for removal of water from fuel is required, a gas or nitrogen enriched air may be passed through the fuel to catch and transfer out water vapor. Reduction of the partial pressure of water at the fuel/ullage interface is realized. This shift in equilibrium condition forces water to evaporate from the fuel's entire surface. The rate of decrease of the moisture content in the ullage is determined by the NEA mass flow rate and this was found to be the dominant contributor to the tanks ullage and stored fuel surface drying time. When pumping NEA through the fuel, a significant decrease of moisture was realized even when the NEA is not pumped through the fuel (such as the use of ambient air or dry air). Doubling the mass NEA flow rate may halve the drying time.

Fuel drying times will correlate to a mass flow rate of dry inert gas (nitrogen) flowing through the empty space (ullage) of a fuel storage tank. As water concentration in fuel is reduced, it is expected that a concentration difference between the ullage and fuel surface/ullage interface will be realized. Evaporation occurring on the entire fuel/ullage interface may be an important factor for the drying effect and reduction of water dissolved in stored fuel. The process for removing moisture from stored fuel, or a bulk fuel storage tank primary empty space may preserve quality of product stored and control tank boundary integrity degradation requiring very little bulk storage tank design modification.

It is important to keep the water below its saturation point so that it stays dissolved rather than entering equipment as free water. Equipment manufacturers specify that ZERO free water must reach the engine. Saturation points vary from roughly 50 ppm to 1800 ppm based on temperature and on the petroleum diesel/biodiesel ratio.

Referring now to FIG. 1, a simplified method for diesel distillation within an underground storage tank 1 is shown. Liquid fuel 4 is stored in an underground storage tank 1 as shown. Fuel 4 partially fills the tank 1, here shown approximately half full, and the remaining (top of the tank) is composed of an ullage 5. Hydrocarbon vapor 9 mixes with other gases 8 in the ullage 5. Typically a submersible pump 3 is included, such as at a retail dispensation outlet where the fuel is drawn from the bottom of the tank up through the submersible pump to fill lines for dispensation for vehicles 100, etc. The tank 1 may also include a vent 6, and one or more access points 14 and 15 useful for the diesel distillation method. A processing pump 7 may be included to draw fuel out of the tank 1 through outlet tube 12. Typically, fuel will be drawn through outlet tube 12 inserted through access port 14 into the tank 1. The outlet tube 12 is run down to the lower portion preferably below the fuel line 2, towards the bottom 18, of the tank 1 to ensure that a solid fuel line 19 is drawn into the outlet pipe 12 without pulling any gas from the ullage 5.

The fuel is run up and out of the tank 1, through (or past) the pump 7, and returned in a second inlet pipe 13 back into the tank 1 through the same access port 14 or another (as shown) access port 15. A reducer coupling 11 may be placed on the return line inlet tube 13 to ensure that the fuel runs properly, or to control the pressure in the line, such as to induce a specific release of pressure on the fuel when exiting 13' the return line outlet pipe 13 into the tank. In one embodiment, as shown in FIG. 1, the fuel return line inlet tube 13 is placed within the ullage 5, and not into the liquid fuel 4. In this manner, the fuel dropping 8 out of the return line 13' dumps over and into the ullage 5, providing for more surface area for the exiting liquid fuel to contact with gases extant in the ullage 5 and allow hydrocarbon vapors 9 to exit the fuel. It is contemplated that the ullage 5 of the tank 1 may be initially inerted to avoid sparks that can occur as the kinetic energy of the returning fuel releases to cause sparks and fires or other hazards within the tank. Inerting of the tank can be accomplished in ways known in the art, for instance using nitrogen gas, carbon dioxide gas, or carbon monoxide gas to ensure a safe ullage when running this system. It is contemplated that inert gases will be pumped into the tank to displace hydrocarbon vapor prior to beginning, or at the outset of the diesel distillation method. Hydrocarbon vapors can be drawn out through the vent or other access points or recovered.

Figure 2:
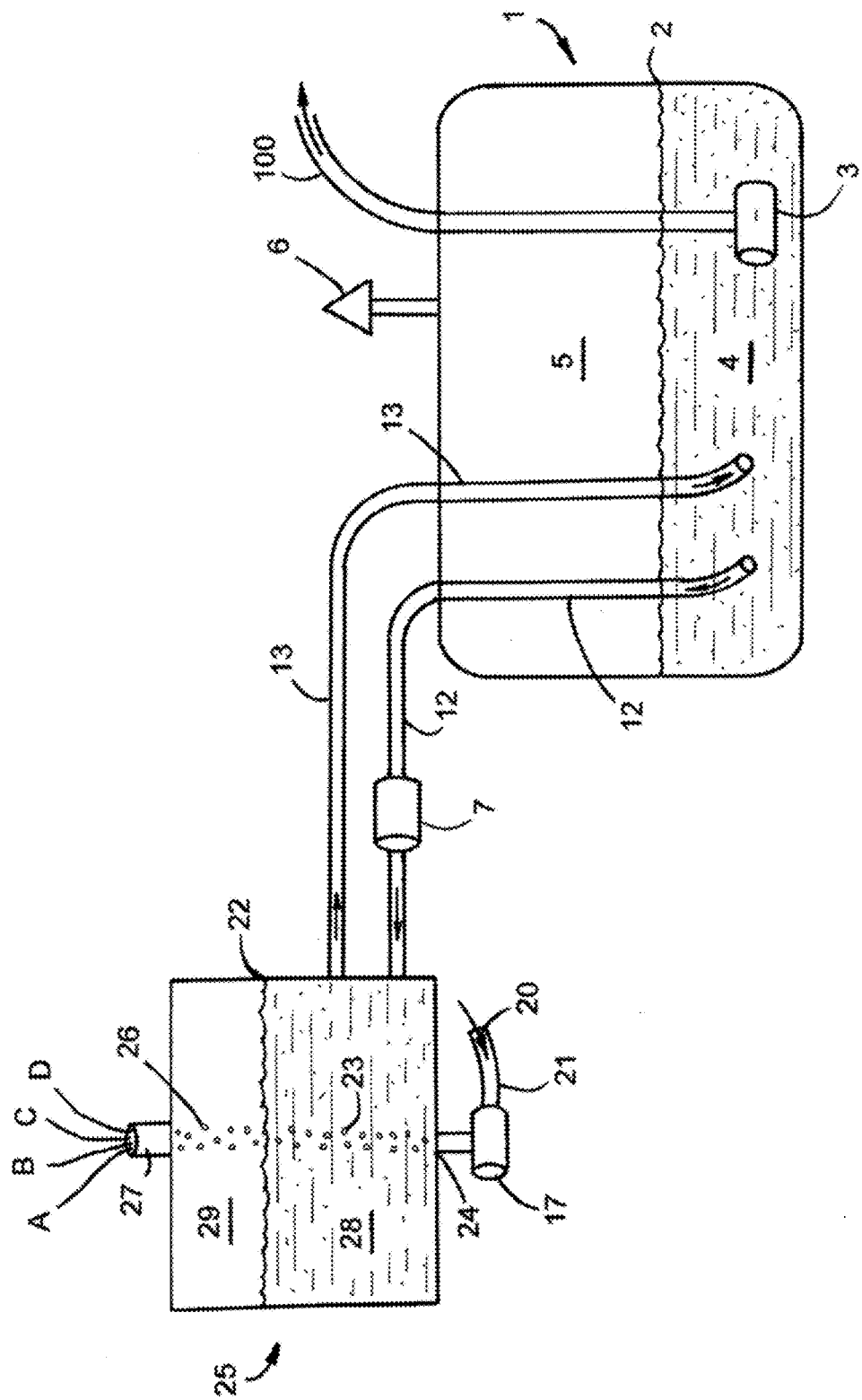
FIG. 2 illustrates another cross-sectional schematic side view of an embodiment of the present invention.

As shown in FIG. 2, a preferred embodiment of the present invention includes the primary tank 1, typically an underground storage tank (UST) as is known in the art, with fuel 4 and ullage 5 stored therewithin. Typically, the submersible pump 3 draws fuel out of the tank 1 towards the fill lines 100. The tank 1 may be vented via vent 6. Similar to the embodiment shown in FIG. 2, a process pump 17 may be used to draw out fuel through an outlet tube 12 and then return to the tank in an inlet tube 13 on return line. In this second embodiment shown in FIG. 2, a secondary tank 25 is used for aeration. The secondary tank 25 is preferably 'explosion proof' for the fuels and atmospheric pressures, or must be similarly protected by inerting the vapor space 29 to prevent static or transient voltage from sparking an explosion. The return of cleaned/processed diesel is brought back into the fuel via inlet tube 13, typically discharging within the liquid fuel portion 4 of the primary storage tank 1. This reduces much of the risk involved versus the process shown in FIG. 1 (aerating the fuel within the ullage). An aeration pump 17 may be used in addition to the diesel pump 7 to provide for air 20. Air 20 enters the aeration pump 17 and is drawn through air line 21 into the fuel 28 in the secondary tank 25. Fuel is supplied into secondary tank 25 via pump 7. Preferably fuel is introduced at a very low point on the secondary tank 25 below secondary tank fuel line 22 to avoid static discharge that may occur if the fuel is dumped over remnant gases 29 in the secondary tank 25. It is appropriate to ensure that there is a full line (solid fuel in pipe) supply and a full line draw in outlet tube 12. Similarly, the return line inlet tube 13 should be drawn from the secondary tank 25 at a point at which it is below the existing fuel line 22 in the secondary tank 25, to ensure that these lines are completely filled with fuel and do not have gases or other hydrocarbon vapors existing in gaseous form within the pipes.

In a preferred embodiment, the aeration pump 17 accesses, as well as the supply to the secondary tank and the return for the secondary tank as discussed above, are all accomplished at the bottom surface 24 of the secondary tank 25. Air 20 is pumped into and through the fuel 23 arriving from the bottom of the tank 24. As the air 23 enters, hydrocarbon fluids in fuel 28 become agitated, and mixed with the air 23. Thus high gravity hydrocarbons can be released into the ullage 29 of the secondary tank 29 as hydrocarbon vapors 26. The air 23 being pumped into the secondary tank 25 causes a high pressure which is released through the secondary tank vent 27. There are at least four means for disposing vapors (A, B, C, D) preferred in the present invention (discussed below). The air 23 into the aeration pump 17 can be a mix of atmospheric gases, or can be a set gaseous mixture that ensures the clean diesel returning to the tank is not otherwise contaminated. One risk is that water vapor may be introduced into the fuel which could cause issues with the primary tank storage, such as corrosion etc., or reduce the value of the fuel. It is therefore a preferred embodiment to include a gas (combination) s air 20 that will not dilute or otherwise mix with the fuel, but will purely be used to draw hydrocarbon vapors out of the fuel. Rising from the vent 27 of the secondary tank, a primary use of the hydrocarbon vapors (labeled "A") could be to a condenser. Hydrocarbon vapors exiting the contaminated diesel fuel typically are those lighter high gravity hydrocarbons such as propane, butane, heptane, methane, which can later be condensed back into liquid form and used for alternative purposes. This may be accomplished by running the vapors through a cold heat sink (e.g. ice, refrigerant, coils, etc.). Once condensed, the lighter fuels may be mixed into a gasoline tank or otherwise used for alternative fuels, for industrial uses, reprocessing into other products, etc. Gases and vapors exiting from the fuel conditioner (e.g. secondary fuel tank, fuel line, etc.) can be run through tubing or coils (approximately ten to fifteen meters) in an ice bath. Heat exchange is made through the coils into the ice(-water) bath to reduce temperature of exiting vapors, and thus condense into liquid. A small volume of liquid hydrocarbons can be used to power the conditioning pump. Further, the extracted vapor hydrocarbons can be added to the carburetor of the generator to supply additional power/energy into the conditioning process or to power the pump system. Hydrocarbon vapor may be run through a carbon canister or through a cooling vent to capture and/or reduce the volatile organic compounds (VOCs). Otherwise, the excess liquid hydrocarbons removed from the diesel can be reintroduced into a supply of higher-gravity fuels, such as gasoline USTs (given the small volume, this should not put the gasoline out of specification).

A second use, labeled "B", could simply include releasing the vapors into environment. Releasing hydrocarbon vapors into the atmosphere is not preferred, but may be used when the contamination of the diesel is only at a very low level. Atmospheric discharge is not preferred during the day as the exiting hydrocarbon vapors can mix with ultraviolet radiation (i.e. from the sun) and produce smog. Therefore, use "C" might include a thermal burner or oxidizer at the vent. The thermal burner may not be placed directly on the vent, but could be tubed out to be burned at a location further from the fuel, as is known in the art, for instance at the roof of a gas station at the oxidizer. A fourth idea shown as "D" could be running the hydrocarbon vapors through a charcoal scrubber, or other scrubber known in the art. Activated charcoal can typically be used in such scrubbers set up on a pressure swing. The scrubber can be set on a pressure swing so that it can be switched out when the hydrocarbon becomes saturated or is otherwise filled so that a secondary scrubber can be put right on to the line. Hydrocarbon vapors in the scrubber can be recovered via vacuuming, pulling the hydrocarbon materials out of the scrubber. The scrubber can be a source for gases or liquids as is known in the art. One risk to using the scrubber is that as the hydrocarbon vapors are added to charcoal in the scrubber producing heat which may become volatile. Therefore, the speed of the hydrocarbon vapor scrubbing must be controlled in order to control the heat generated in the scrubber. Therefore on running the system, a larger amount of hydrocarbons are released at the beginning of the process, due to the contamination level of the diesel fuel. Therefore, it may be necessary to run the process slower at first. As the contaminated diesel fuel becomes more and more pure, less and less hydrocarbon vapors are released, and the process can be sped up. On speeding up the processing, a larger volume per unit of time can be run through the system and the release of hydrocarbon vapors can thereby be controlled.

This process can also be used to recover ethanol from petroleum contaminated water (PCW). Oftentimes, water can contaminate ethanol-doped gasoline, and cause separation of the fuel (as is known in the art). The water/ethanol mixture can be pumped from the bottom of the fuel tank (e.g. UST), to a separate storage container. The separate storage container acts as the primary storage tank tin the process, and the ethanol/water mixture is run through the aeration process. Hydrocarbons and/or ethanol can be released, while the water is left behind—so that the process acts to condition the water. It is contemplated that the incoming air in such a process will be maintained below the boiling temperature of water so as to prevent excess water vapor removal.

During aeration to correct flash point of the fuel, a calculated mass flow of nitrogen NEA is (can be if determined necessary) dosed into the flash fuel flow treatment circulation loop. The nitrogen effect of passing through a second in-line aerating unit (down stream) may then dry the field (to pull water therefrom) via disruption of equilibrium and vents moisture absorbed (see Henry's and Fick's laws) to atmosphere as moisture kinetically released (transferred) from the fuel (absorbed into purging flow of nitrogen).

Figure 3:
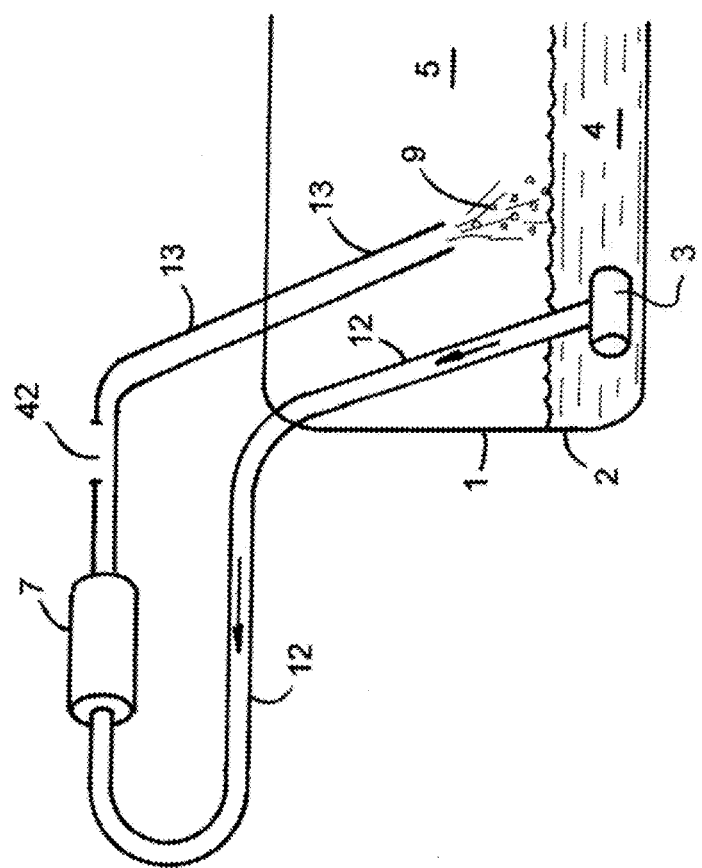
FIG. 3 illustrates a cross-sectional view of another embodiment of the present invention.
Figure 4:
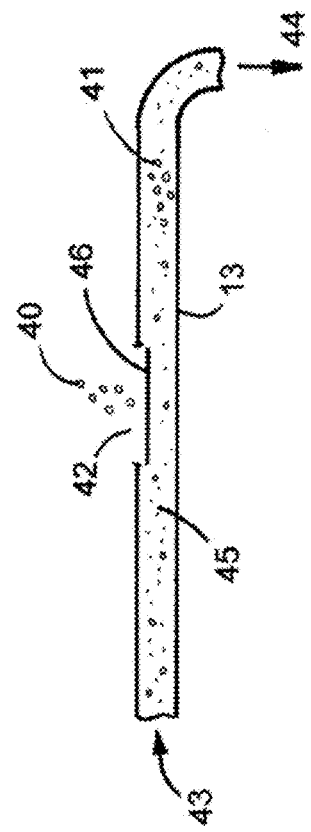
FIG. 4 illustrates a close-up of the air inlet as shown in FIG. 3.

An alternative embodiment is shown in FIGS. 3 and 4 whereby the Venturi effect can be used to draw air into the fuel, whereby the air or other gases mix with the fuel and draw out light hydrocarbon vapors. Fuel 4 can be drawn out of the tank through a pump 7. On a return line inlet tube 13 an air inlet 42 (or gap) is provided for exposure to atmosphere, atmospheric pressure, or otherwise controlled gases/pressures that are then mixed within the fuel lines. Gas or air 41 can be drawn by the Venturi effect, or otherwise be inserted from a high pressure tank, such as a nitrogen gas tank, into the fuel return line inlet tube 13. The returning fuel can then be dumped back into the tank 1. The fuel being returned to the tank is typically a mixture of air and fuel whereby hydrocarbon vapors 9 may be mixed in with the air 41. The returning fuel could be released under the fuel line 2 or over the ullage 5. The hydrocarbon vapors 40 once in the air or otherwise vaporized can then be drawn out of the tank through the vent (not shown) or otherwise vacuumed or collected through an additional access port (not shown). As shown in FIG. 4, the air inlet 42 using the Venturi effect can draw air 41 in to the fuel line 45 whereby air bubbles 41 will form in the fuel return line 13 and pull out hydrocarbon vapors 40. It is contemplated that when using the Venturi effect under atmospheric pressure, the hydrocarbon vapors may be released. Therefore, a high pressure tank (not shown) may be attached at the air inlet 42, or some other recovery mechanism can be used to capture the hydrocarbon vapors as they may exit the return line 13. Fuel flows through return line 43 back 44 to tank 1. Fuel 45 may include a fuel surface 46 exposed at air inlet 42.

Figure 6:
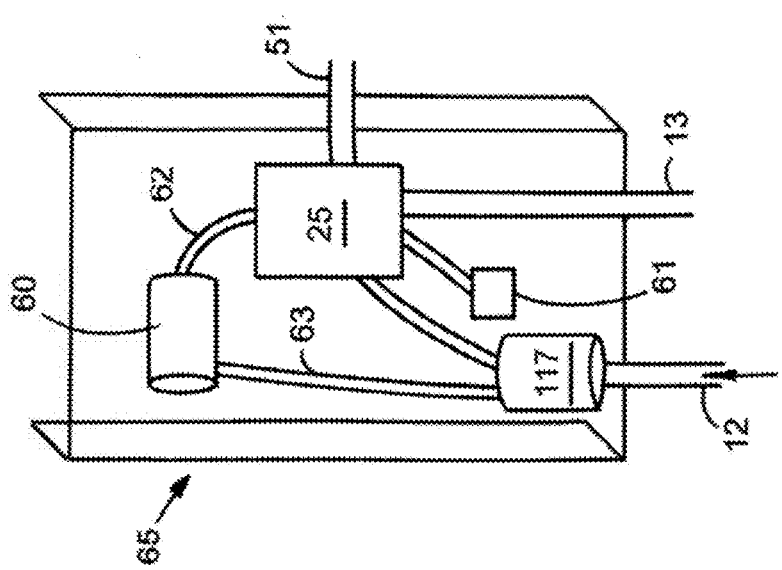
FIG. 6 illustrates a top view of the truck bed as shown in FIG. 5.
Figure 5:
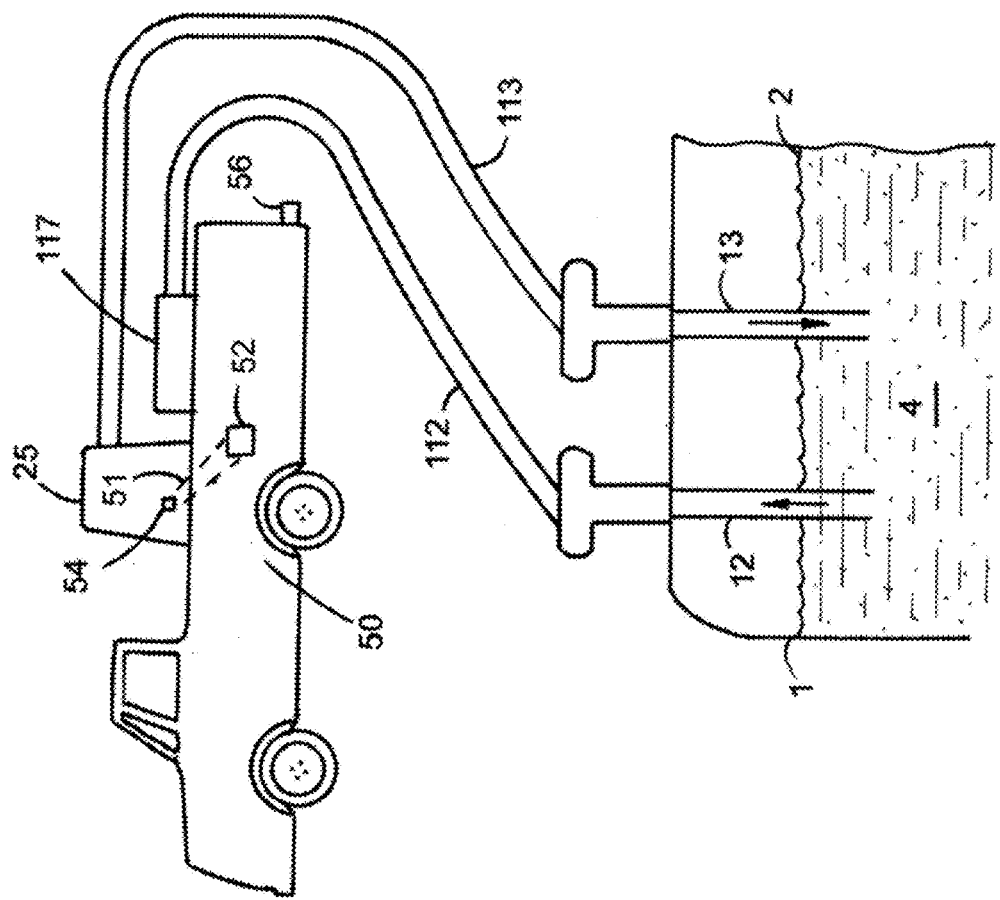
FIG. 5 illustrates an alternative embodiment of the present invention and cross-sectional view including a light vehicle truck.

As shown in FIGS. 5 and 6, a complete system is shown for diesel distillation. Fuel 4 is drawn out of the tank 1 through the distillation system and returned into the tank. It is preferred that a solid column of fuel is used in outlet tube 12 and inlet tube 13. Therefore, the draw and return to the tank 1 are both placed below the fuel line 2 to ensure a full column of liquid in all the tubing. Fuel 4 is drawn out of the tank 1 through outlet tube 12 through the pump 117, run into the secondary tank 25 (as previously described above) and then returned into the tank 1 via inlet tubing 113 through inlet tube 13. The fuel can be taken and sampled from the secondary tank 25 to be put into the combustion engine on the truck 50. This can be done through a pre-existing line or can otherwise be drawn into a tertiary tank (not shown) and put into the vehicle tank. Fuel is removed from secondary tank 25 through outlet 54 along sampling line 51 and into fuel receptacle 52 on vehicle to access onboard combustion engine. When sampling the fuel from the secondary tank 25 in the vehicle 50, the combustion engine on the truck 50 runs and emits exhaust through exhaust pipe 56. Onboard sensors and CPU (not shown) determine the value, grade, and contamination level of the fuel. By running one or more samples over time, or continuously testing the fuel through the vehicle onboard diesel combustion engine, one can determine when the diesel fuel is completely decontaminated or otherwise ready for further testing, or the processing is complete. Sampling may be done in a separate container with various sensors, or via a combustion engine that is separate and apart from the vehicle's engine.

Referring to FIG. 6, the truck bed 65 may include the pump 117 and secondary aeration tank 61. Truck bed 65 may also house possible a condenser/generator 60 along the vent of hydrocarbon vapor line 62. In an embodiment, it is contemplated that the captured hydrocarbon vapors from the 62 vent can be run through a condenser 60 and supply power to pump 117 and system via power supply line 63. A generator (not shown) can be coupled with the condenser and used to combust the hydrocarbon vapors and produce electrical power to run the pump 117 and system or can otherwise be included in a hydrocarbon powered pump system. Power supply line may be included to provide hydrocarbon fuels, or in the case of a generator, electrical power to pump 117. A sampling line 51 can be run from the secondary tank 25 with a valve (not shown) that can be used for manually sampling or automated time to sampling of the fuel through the truck onboard vehicle diesel combustion engine and sensor system. A valve (not shown) may be placed on the sampling line. A truck bed (as shown), or portable trailer, or other platform/housing can be used to house system.

One aspect of the present invention is the mobility of such a system so as to allow local treatment of USTs at distant locations (such retail fueling stations). The entire system can be mounted and contained on a portable vehicle or trailer and delivered to a station. The system is then deployed and conditioning can occur on site. This alleviates the need to transport the fuel to a conditioning or repurposing or recycling station.

It has been shown that a five hundred milliliter sample of diesel that is contaminated with an additional one hundred milliliters of gasoline can be decontaminated by use of the aeration system. The diesel fuel may be agitated to cause the release of hydrocarbon vapors. The Venturi effect can be used, or the atmosphere can be used to oxidize hydrocarbon vapor as it releases from the fuel via higher vapor pressure. As is known in the art, gasoline vapor pressure is very high such that high gravity molecules in gasoline will change from a liquid to gaseous state under atmospheric pressure. Merely exposing the contaminated fuel to the air over time can lead to the distillation of the diesel. The present invention includes a manner to conduct that distillation under a controlled system, to capture the off-gassing hydrocarbon vapors, or to accelerate the process. The present invention also includes a method of conducting the distillation above ground for an underground storage tank. Kinetic energy can be transferred from the pump system into the fuel line and used to draw air into the fuel or otherwise cause the hydrocarbon vapor to release during the change in pressure of the fuel to vaporize the gases. It is contemplated that the supply line could be a standard two-inch suction line as is known in the art. When using a Venturi embodiment of the present invention, it is contemplated and preferred that a 1-inch tube is used on the return with the Venturi.

Figure 7:
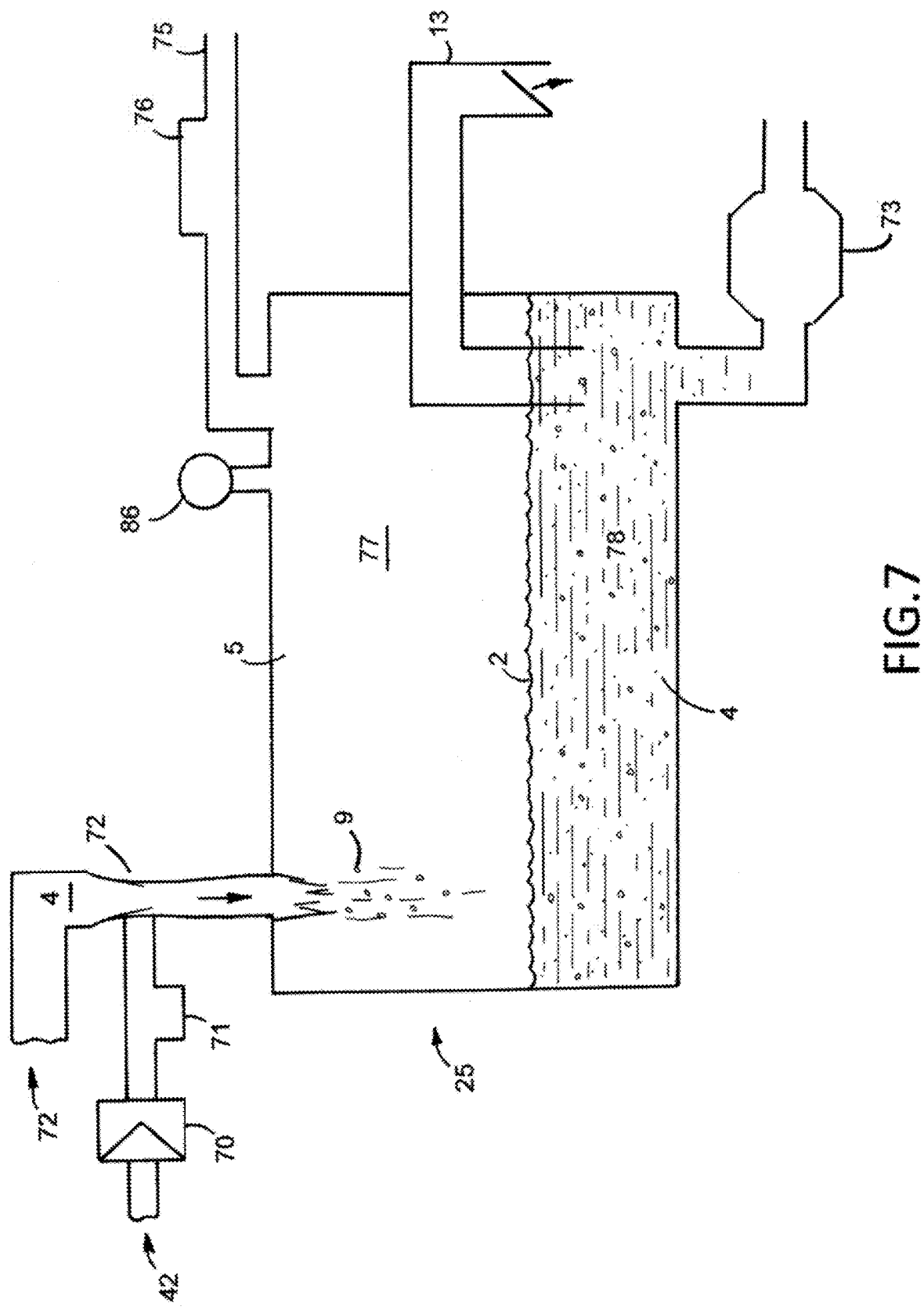
FIG. 7 illustrates a cross-sectional view of another alternative embodiment of the present invention.

Referring to FIG. 7, a secondary fuel processing tank 25 is shown (the primary storage tank is not shown). Fuel 4 enters the secondary tank 25 through the fuel flow outlet tube 12. In-line aeration 42 may be provided via atmosphere entering process. A vapor check valve 70 is provided along the inflow of air/gases. It is contemplated that the aeration may be completed with ambient atmospheric air. A narrowing 72 of the outlet tube 12 may provide for the forces necessary to draw in outside gases through inlet 42 to provide for the Venturi aeration. A vacuum gauge 71 may be provided between the air inlet 42 and the fuel flow line 12 to monitor the available Venturi vacuum effect of liquid flow and the dynamic back pressure created by the extraction of (hydrocarbon (potentially flammable) vapor during the process. Back pressure may be measured in inches of water column. Inlet Venturi vacuum pressure production may be measured in mercury or water column. During the flow and process of vapor extraction, some throttle up and down between at the vena of the Venturi (as back pressure) may build. The Vapor Check 70 may include a flow ball-valve. The additional item on the atmosphere entering line 42 may be a vapor (air in) flow reed check (or what may be known in the art as a "liquid diode").

Fuel 4 may enter the secondary tank 25 from above the ullage 5, or may be delivered under the fuel line 2 to avoid static discharge risk (discussed above). Hydrocarbon vapors 9 will typically rise into the Process Produced Vapor (PPV) section 77 of the ullage 5, while the liquid fuel 4 will drop to the bottom of the tank 25 into the circulating fuel 78. Fuel 4 is returned to the primary fuel storage tank 1 out Fuel Flow Returning inlet tube 13. It is contemplated that it is best practice to draw a full fuel column in the returning fuel line 13 to be deposited below the fuel line in the primary tank (not shown).

A Vapor Pressure Process Gauge 86 may be included on the secondary tank 25. If the outlet flow (of processed aerated fuel) is smaller than the inlet flow (due to the loss of hydrocarbons via vapor) then a small dynamic back pressure may build in the process tank. The process may be dependent on a small or low backpressure to force extracted flammable vapors out of the secondary tank and through Flammable Contaminating Vapors Extracted. These vapors may then be directed onto the choice of, 1) a thermal oxidizer, 2) an activated carbon scrubber, 3) a vapor condensing tube or, 4) exhaust at night or when unregulated to atmosphere, or otherwise. The process may require a calibration of the flow in and discharge flow out of a single process chamber to preserve sufficient head space for the collection of vapors. The present platform configuration is an effort to minimize equipment profile and may require a different mounting configuration.

The Process Tank Drain line 73 may be provided with a line to drain the secondary tank 25. A second processing tank (or "tertiary tank") (not shown) may be used to collect hydrocarbon vapors before returning the cycled processed fuel to the primary tank. The tertiary tank may be emplaced above the secondary tank 25 to act as a dry head space to further collect and separate vapors. This may create a refining tower as applied to the present invention.

The efficiency of the Venturi effect eductor system may use Bernoulli's Principle to pull the fuel at narrowing 72. Alternative embodiments may utilize an eductor (as is known in the art to be a subunit to utilize pressure to create a vacuum) to enhance or improve the processes. In one alternative embodiment, a pump may pressurize fuel coming out of the primary tank through an eductor (to provide aeration) and then into a secondary storage tank. The compression through the eductor may increase the flow speed and impart kinetic energy into the moving fuel. This energy may be released as the fuel is delivered into the secondary fuel tank, and further enhance/cause vaporization of the high gravity hydrocarbons. The eductor may be utilized for drawing from the initial primary tank.

Figure 8:
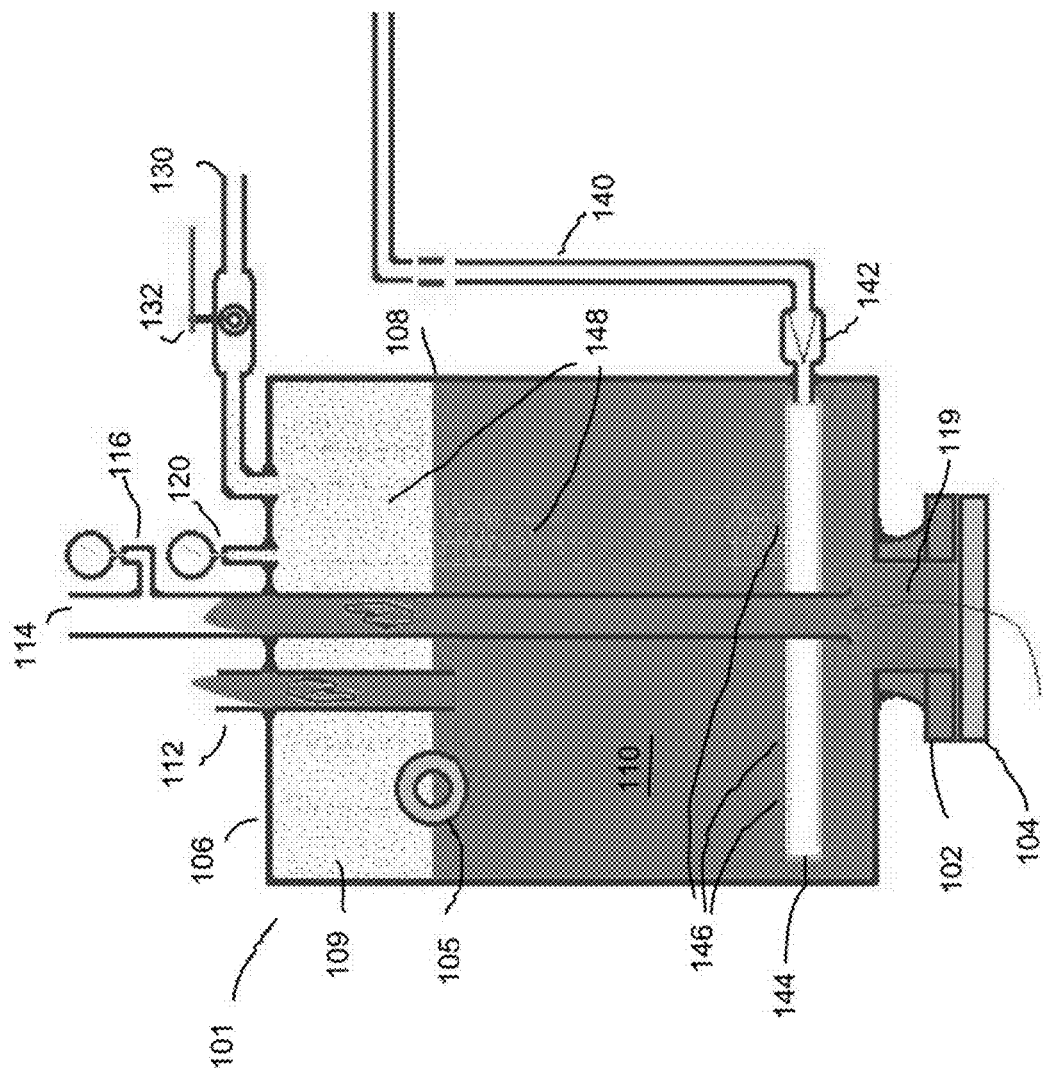
FIG. 8 illustrates a cross section of treatment tank of an embodiment of the present invention.

As shown in FIG. 8, a flash aerator is shown in cross-section. The flash aerator may be permanently mounted, mounted onto a moving trailer platform, onto a vehicle or otherwise. Preferably, the flash aerator is mounted onto a trailer platform. Aerator tank 101 is mounted onto a platform surface (not shown) via a flanged seal 102 (which may also be placed over a gasket 104. For illustrative example, but not to be read as limiting, sizes are herein shared. Flange may be a four inch rounded unit, while aeration tank may be approximately diameter (or side wall length) of twelve inches and thirty-six inches high. Aeration tank 101 may include lower area 119 to capture debris and separated material, and may be cleaned between treatment servicing.

Fuel 110 flows into aerator tank 101 through inlet tube 112 along top 106 of aeration tank. Similarly fuel flows out of aeration tank via outlet tube 114 out of tank and past fuel pressure gauge 116. Aerator tank 101 includes a fuel level 108 and vapor space/ullage 109. Sight 105 may be applied on an external surface of the aerator tank to view the fuel line level 108. Sight 105 may be a reinforced transparent window. Pressure within aerator tank 100 may be measured by pressure gauge 120. Gas, air and hydrocarbon vapor may be removed via outlet tube 130. Air and vapor leaves aerator tank under pressure and may be removed to a processor, as described above. A ball valve 132 may be placed on outlet tube 130. Ball valve 132 may be used t control and balance pump and air in pressure to maintain processed fuel and vapor space level.

Air, NEA, oxygenated air, ambient air, or other as needed (referred to generally as air) is supplied into aerator tank 101 below fuel level 108. A backflow check valve 142 may be placed on air inlet 140. Air is supplied under pressure, and pressure of tank system is maintained, preferably to maintain fuel level at a specific height (as inflow of fuel and air, as well as outflow of fuel and vent are monitored and maintained appropriately). Aerator 144 is supplied in along a tube or ring below fuel line, preferably towards bottom, to allow air to exit and raise through the fuel to interact with the fuel. Aerator 144 includes apertures 146 to allow air to escape. Bubbles 148 rise and expand as they reach the fuel level 108.

Figure 9:
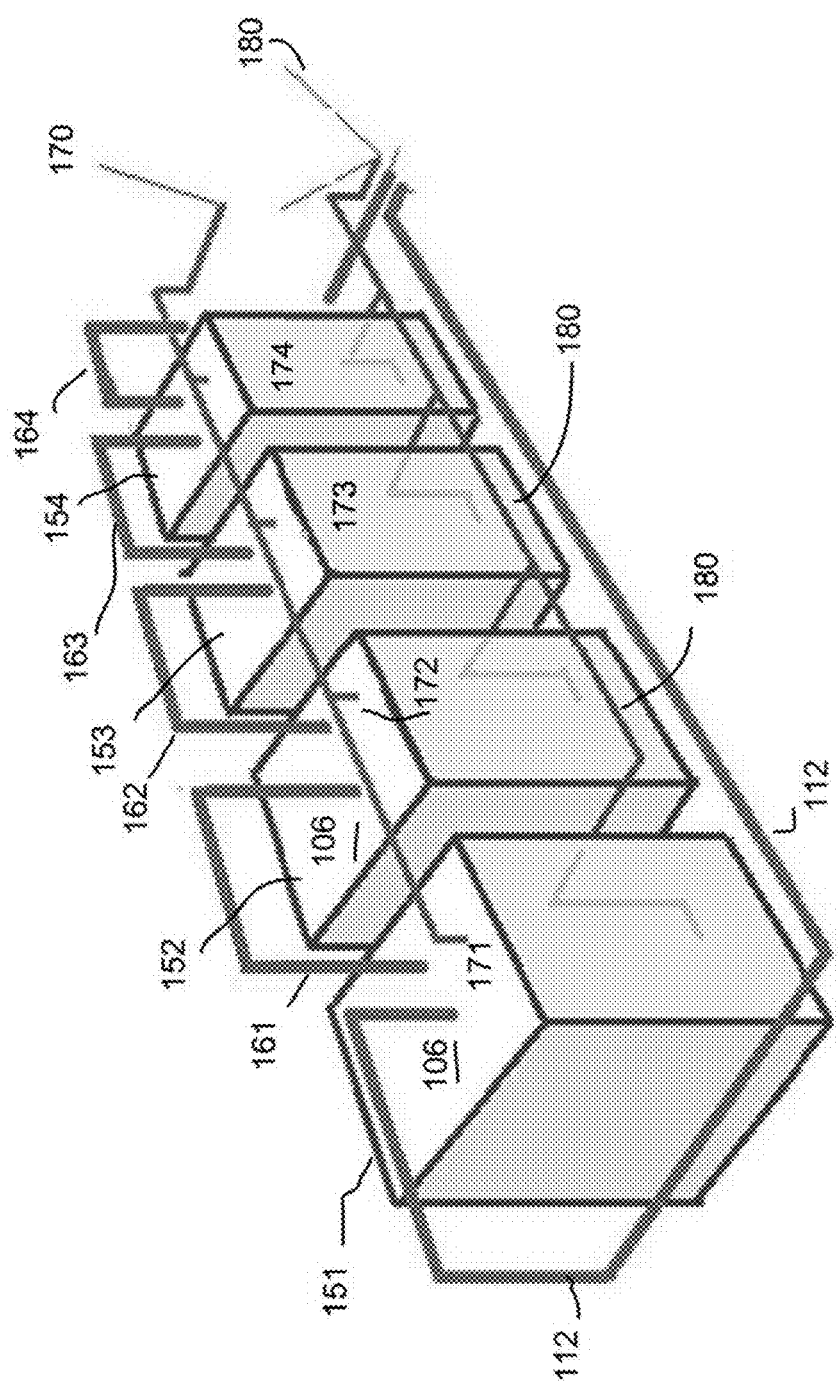
FIG. 9 illustrates a perspective view of a linear array of treatment tanks of an embodiment of the present invention.

As can be seen in FIG. 9, an array or lined up aeration tanks 100 may be used. Fuel may be introduced to array via inlet tube 112 and enter into first tank 151 along top 106 of aeration tank 151. Fuel leaves via outlet tube 161 and enters next tank 152, and so on. Fuel leaves tank 152 through outlet tube 162 to enter into tank 153, and then exit via tube 163 to enter tank 154. Treated fuel leaves via outlet tube 164 from top 106 of tank 154 and is directed back to storage tank (not shown).

Air may be supplied by aeration lines 180. Air may be removed from tank along air vent line 170. Air vent line 170 attaches in series, or parallel (not shown), to each of tanks 151, 152, 153, and 154, via outlet 171, 172, 173, 174, respectively. Similarly, air may be supplied via air line 180 via aerators into each of tanks 151, 152, 153, and 154. Air may be supplied in series or parallel, and/or a separate line (and air type) may be supplied into each aeration tank. Each inlet of air, or outlet of air may include a valve to control pressures, and/or bypass one or more aerator tanks. Tanks may be manifold together. Preferably, all tanks are affixed to the same platform.

One Fuel Pump can be Used to Power and Move Fuel Through Entire Process

The first or second aeration unit can be optionally used just to dry fuel as above. System may process for 1. Flash correction only, 2. flash correction and fuel moisture absorption and (drying) correction, or moisture absorption (drying) correction. For equipment to operate the aeration unit feed of dry air would additionally be used to feed the calculated mass flow of nitrogen. Understand the first aeration unit processing and correcting flash using dry air will have effect for absorbing moisture as well. The adding of the second aeration unit may accelerate the process. One may use operational and connected on a servicing platform 1, 2, 3, or 4 aeration units. Up to four inline: one banked for just flash; one banked for just moisture; two banks in line with first in line banked for just flash, and a second in line down stream for moisture. Standard ambient or dry air may be used in first tank along array to correct flash point and remove high gravity hydrocarbons, while NEA may be supplied to a later tank to correct for water vapor. Fuel may be treated for water in the first tank, and high flash point in the second tank, and repeating in pattern, or the first few tanks may be used for water treatment via NEA, and the later tanks treated for high gravity hydrocarbons.

Sample of fuel will be tested for water and/or gasoline (flash point). To remove gasoline, air may be used, and to remove water NEA may be used. It is preferred that flash point correction is made prior to water correction (NEA), however, any order may be used for aeration tanks. By disturbing the vapor pressure equilibrium at the surface of the fuel in each aeration tank the contaminants may be removed. Air bubbles rise from aerator and expand. At interface of surface the kinetic energy of release causes additional transportation of contaminants. Bubbling in tank from aerator causes circulation of fuel within aerator tank. Additionally, the distance of fuel supply and exit causes circulation of fuel.

Water is preferably removed to 30 ppm. When beginning the treatment, the pressures will be monitored and aeration tanks will be supplied with fuel. Pressure is monitored and the ball valve on the air out is used to purge the excess pressure. A transducer may be used along with gauges to calibrate appropriate pressures to ensure level of fuel within standard parameters, often viewable through sight window. A computer may be used to control and optimize pressures in system, and to provide a fail safe, such as an auto-shut-off if pressure drops or changes significantly. Compressed air pressure should not exceed fuel pump. One may wish to ensure head pressure is less than half of fuel in pump pressure. Pressures may be set at 50-100 psi.

Another alternative embodiment may use an eductor to (assist in) draw(ing) fuel from the primary tank. A vacuum created at the far end of the eductor may provide additional space for the fuel to spontaneously separate into liquid and vapor fuels on the far end of the eductor. Another alternative embodiment may use injected air to pressurize the fuel in line (doubling as a means for drawing vapors out of the liquid fuel). The fuel may run through an eductor and cause the Venturi effect to draw air into the line post-eductor.

In testing, fluid was conducted through an aspirator at one hundred-twenty gallons per minute. Various uses of off-gas hydrocarbon vapors included a charcoal scrubber flaring to burn off the hydrocarbon, or use of a glycol chiller to condense the hydrocarbon vapors into liquid fuels for potential future re-use or recycling. The condensed vapor can be added back into a gasoline store or otherwise held separately for later use or to be resold as high gravity hydrocarbon fuel(s). Flaring could be used as a local burner with a backflow preventer to ensure safety. A flash test can be used to determine whether or not the contaminated diesel is back into within industry specifications and the flashpoint must be within specification for diesel fuel. When diesel is contaminated with gasoline, the flashpoint of the diesel lowers and the fuel becomes more combustible and volatile.

The rates of fuel fluid flow and aeration tested and contemplated range as follows. Once the system was designed, testing included the speed of fluid flow of sixty gallons per minute (GPM), while aeration was conducted through the flow at approximately fifteen cubic feet per minute (CFM). The fuel flow may flow as slow as one gallon per hour, up to about one-thousand GPM. Flow below five gallons per hour proved not to be cost effective given the time to move enough fluid in a typical UST. Typical pumps useful for the portable embodiment(s) of the present invention typically are capable of moving approximately two hundred to five hundred gallons of fuel per minute. The aeration ranged from a few cubic feet per minute (CFM), up to one hundred CFM. A preferable ratio was found to be between 1:2 to 1:4 air to fuel CFM:GPM. However, it is considered that maximizing the surface contact of the fuel exposed to the air will improve the speed and/or efficiency of the system to remove vapors. Therefore, higher velocity aeration is contemplated at a 2:1 ration or much higher. Preferably a higher aeration CFM would be provided at a similar fuel GPM flow rate. Fuel flow was run at about 90 pounds-per-square-inch (psi). However, other testing also conducted fuel at maximum of 200 psi. The present ranges of fuel, air flow, and pressures achieved were conducted due to the limitations in available pumps, tubing, etc. and should not be read to limit the nature or use of the present invention. As the state of the art of systems, power-drives, and pumps increases, the speeds and pressures available may be only limited by the nature of the fuel and gases chosen. A first pass through treatment may not always result in acceptable fuel properties. Therefore, the fuel treatment process may be continued over a larger span of fuel in tank.

When a secondary tank is used for aeration, air is typically pumped from underneath (i.e. bottom surface of secondary tank), or from a low level (below the fuel fill level in the secondary tank. Air may be introduced into the secondary tank form a single aperture, or from a multitude of apertures, for instance along a line or array of tubes. Preferably the air is supplied from a single pump, but system may include additional air pumps. Given the nature of an embodiment of the present invention to be portable, for instance in the back of a pick-up truck, or pulled on a trailer, the size of the secondary tank is limited. Small secondary tanks have been allowed a 6" depth of fuel in the tank. All apertures (input, output, and air source) may be placed below this level. When possible, the vertical height of fluid in secondary tank embodiment would be at least one-foot, if not two-feet (24") or deeper/higher. Within a set range, the more exposure of the fuel (surface of bubbles, time and surface area) to the air the more hydrocarbons can be removed. At some point, however, the air passing through the fuel becomes (closer to) saturated and diminishing returns are encountered.

Given the related mixtures of hydrocarbons in diesel and gasoline fuel during testing the five hundred milliliter diesel with one hundred milliliters of gasoline was returned to five hundred-fifty milliliters of flash-test-passing diesel fuel. Thus approximately 50% of the hydrocarbons in the gasoline were added to the diesel fuel which increased the volume of the diesel fuel. This approximate 10% or 20% contamination of the diesel was easily resolved through the aeration method. In order to bring the diesel back up to spec, cetane boost was added to the five hundred-fifty milliliters of repaired diesel fuel to ensure that the cetane levels were appropriate and various methods were employed to ascertain that the fuel returned to a safe flashpoint related to normal diesel. A very small amount of cetane boost was required, on the order of one milliliter or less. A hydrometer or other weight measurement system can be used to determine the amount of contamination, or the success in decontaminating. For relative comparison, diesel weighs on average is about 0.85, as is known in the art, whereas gasoline weighs about 0.72 and a mixture of the two could be anywhere therebetween. Once stripping the diesel of light hydrocarbons, the weight can return to 0.84-0.85 with a slight reduction in volume and be useful as a diesel fuel. In such a way, the heavy portions, low gravity, or the long chain hydrocarbons, are retained from the gasoline.

Initially, tests were conducted utilizing air temperature of the incoming pumped air at around 100 F. This temperature of the air (a.k.a. gas or gases) entering is preferably near or above the flash point of the fuel, but below the auto ignition temperature. It is also preferable to maintain the temperature below the boiling point of water (around 212 F around 1 atm). The air was continually cooled (or heated) to ensure that an even temperature of the air was used. One aspect of the present invention is to control the temperature of the incoming air to in the fuel to optimize separation of high-gravity hydrocarbons. Further, the temperature of the fuel (held in UST) was approximately 60 to 75 F, and the conditioning was intended not to heat the fuel in the primary UST. Such heating was limited to less than 2 degrees F. The air entering the secondary fuel tank (or fuel line) for the aeration process is typically conducted via aeration pump into the solid fuel in the secondary tank. The air may be atmospheric air, dehydrated atmospheric air, or otherwise pretreated air, such as via canister or an isolated inert gas or gases. It is contemplated that water vapor present in the air is not preferred, but may not prevent the conditioning process. Entering air may be heated by separate heater, conducted from the pump, or may rely solely on kinetic energy transferred to the moving air through the pump. The hair pump, or compressor, may supply kinetic energy to the incoming air. To reduce the temperature of air entering the secondary tank (or fuel line) the air was dried and chilled coming out of the compressor to 100 F or below. It has been shown that raising the temperature of the air entering the secondary fuel tank from 100 F (or 140 F) to around 200 F resulted in a doubling of the efficiency of the high gravity fuel recovery/conditioning. By doubling the efficiency, twice as much vapor was recovered and/or half of the fuel needed to be treated to result in the same conditioning of the specific elements. Even with the higher temperature of the incoming air into secondary tank, after two hours of running through system, the temperature of fuel in primary UST did not rise noticeably more than 2 degrees F.

A common method for the diesel contamination is via introduction/mixture of gasoline in the lines, reuse of USTs, or otherwise mistake. Gasoline may have numerous grades at a retail location, resulting in a different contamination mix. Furthermore, it has been known for diesel to be contaminated by other constituent materials, such as kerosene, jet fuel (such as JP-5), etc. Given that other contaminants may include significant sulfur content (up to 1,000 ppm in JP-5, for instance), sulfur in the conditioned diesel may need to be maintained/controlled. Other methods for removing sulfur from a hydrocarbon fuel (such as diesel) as are known in the art are contemplated. This sulfur removal will likely occur after the aeration/vaporization conditioning has already commenced, but may be conducted concurrently, before, or after conditioned as described above. Similarly, contamination with sodium and sodium salts may require similar further conditioning/cleaning of the fuel.

A safety test may be conducted, as follows. As hydrocarbon vapors are extracted through the process, the amount of vapors exiting slows as the fuel becomes more dieselized. When the hydrocarbon vapors cease to exit the vapor extraction tube, an oxidizer flame might go out/extinguish. However, the flame might extinguish for a number of other reasons. Restarting the oxidizer (reigniting) may be required if the flare goes out. When the exiting vapor/gases can no longer be oxidized (the air coming out of the system has little or no hydrocarbon vapors), it is preferable to run the system for a certain length of time (such as an additional 20 minutes). The air inlet may be replaced by a source of light hydrocarbon gas flow (e.g. propane, ethane, butane, etc.). For instance, gaseous propane may be used to aerate the fuel. A good portion of the propane will then exit, and a safety test can be conducted to ignite the extracted vapor to check for a flare. Additionally, it is contemplated that running propane, or other like gaseous fuels, through the fuel line may interact with other carbon sources in the fuel, e.g. aromatic hydrocarbons. This may either include additional fuel to the line (as propane is trapped), or further process the fuel as propane may pull/react with other hydrocarbons from the fuel and remove these fuel hydrocarbons via vapor. Other gases may be used to aerate, such as carbon dioxide, carbon monoxide, nitrogen, etc. to modify the aeration process.

The diesel fuel can be tested by running through a vehicle engine and by watching the onboard computer. The fuel can then be adjusted with additives or further processing to ensure that it is clean and like new. A near band IFR can be used to determine the attributes of the fuel. Other data known to determine the quality of diesel fuel includes temperature of combustion (in vehicle onboard combustion system, octane levels, knocking, emissions testing, efficiency of oxygen burn, and in the exhaust sensor manifold, etc.

The present invention is a great advancement over prior art distillation. Prior art methods utilized high heat added to the diesel to burn off or cause the extraction of the high gravity hydrocarbons. Current distillation methods cost upwards of USD $4 per gallon. The present invention uses kinetic energy to draw diesel and light hydrocarbons apart. Static discharge is avoided by the methods described above. A solid column of fuel is drawn out of the tank and returned below the fuel line in typical small low pressure underground storage tanks as are known in the art for use in retail fuel dispensaries otherwise known as gas stations. The aeration line can be very small, such as a one-eighth inch tube, and the inlet to the secondary tank could be a two-inch line, and the outlet from the secondary tank could be a two-inch line, one-inch, or as otherwise would be useful.

The fuel vapor stripper for diesel, described above, repairs diesel for local and remote sites where a larger distillation process is unavailable. The system can be portable, for instance as in the embodiment shown in FIGS. 5 and 6 attached to a portable vehicle. The vapor stripper raises the flashpoint in the diesel from a contaminated hot fuel such as one with a flashpoint between thirty degrees and one hundred degrees Celsius up to a proper diesel flashpoint above one hundred-twenty degrees Celsius (gasoline often spontaneously combusts at about fifty degrees Celsius). It is known to run the current method as much as eight-to-ten times the total volume of the fueled tank to ensure that the hydrocarbon vapors are released in an appropriate speed and fashion. One method of the present invention is to preferably run the process at approximately one hundred-fifty to two hundred-fifty gallons per minute.

We claim:

1. A diesel distillation method comprising the steps of:
    (a) drawing contaminated fuel from a primary storage tank;
    (b) exposing fuel drawn from the primary storage tank to gas;
    (c) evaporating high-gravity hydrocarbons from said fuel;
    (d) sampling fuel from the primary storage tank;
    (e) running the sampled fuel through a combustion engine;
    (f) testing quality of the fuel via a combustion engine with an onboard sensor;
    (g) determining if further processing is required to decontaminate the fuel; and
    (h) returning exposed fuel to the primary storage tank.

2. The method as set forth in claim 1 further comprising the step of inserting one or more inert gases into the primary storage tank ullage to reduce the risk of an explosion through any of many combustion sources, said step of inserting being completed prior to said step of returning.

3. The method as set forth in claim 2 wherein said step of inserting is commenced prior to said step of drawing.

4. The method as set forth in claim 1 further comprising the step of heating the fuel prior to said step of evaporating.

5. The method as set forth in claim 4 wherein said step of heating is conducted via a pump used for said step of drawing.

6. The method as set forth in claim 1 wherein said step of exposing comprises exposing fuel to ambient air and further comprising the step of heating the gas prior to said step or exposing.

7. The method as set forth in claim 1 wherein said step of drawing is at least in part powered by the combustion of evaporated hydrocarbon vapors emanating from the fuel.

8. The method as set forth in claim 1 wherein said step of exposing utilizes the Venturi effect to draw gas into a fuel line to mix with the fuel.

9. The method as set forth in claim 1 wherein said step of drawing is conducted with an eductor used to cause transfer of the fuel out of the primary tank.

10. The method as set forth in claim 9 wherein said step of drawing provides force to cause the fuel to return to the primary storage tank after said step of exposing.

11. The method as set forth in claim 1 further comprising the step of further exposing fuel drawn from the primary storage tank to NEA to remove water from fuel.

12. A diesel distillation system comprising:
    (a) a primary fuel tank;
    (b) a primary aeration tank in fluid communication with said primary fuel tank;
    (c) a secondary aeration tank in fluid communication with said primary fuel tank and said primary aeration tank;
    (d) a third aeration tank in fluid communication with said primary fuel tank and said primary aeration tank and said secondary aeration tank;
    (e) a fourth aeration tank in fluid communication with said primary fuel tank and said primary aeration tank and said secondary aeration tank and said third aeration tank;

(f) a first pump coupled with said primary fuel tank and said a secondary fuel tank providing pressure differential to draw fuel from said primary fuel tank to said secondary fuel tank;

(g) a return line adapted to return the fuel from said fourth aeration tank to said primary fuel tank; and (h) an aeration pump coupled to said secondary fuel tank, said aeration pump adapted to draw gas into the secondary fuel tank so as to expose the fuel to the gas.

13. The system of claim 12 further comprising a combustion system coupled with a sampling line, said combustion engine adapted to combust the fuel drawn from said secondary fuel tank; and a sensor system adapted to analyze combustion in said combustion engine.

14. The system of claim 13 wherein said combustion system is a combustion engine and a sensor system are contained within a motor vehicle.

15. The system of claim 12 wherein said gas comprises nitrogen.

16. The system of claim 12 wherein said aeration pump introduces ambient air into said secondary aeration tank below a fuel fill level.

17. The system of claim 16 wherein said ambient air is dehydrated prior to exposure to the fuel.

18. A hydrocarbon fuel improvement system comprising:

(a) a primary storage tank;

(b) a first pump coupled with said primary storage tank adapted to provide pressure differential to draw fuel from said primary storage tank into a circuit, said circuit having a start within a fuel contained within said primary storage tank and an end within said primary storage tank; and (c) a means for improving the fuel via removal of contaminants from the fuel, said means for improving the fuel located along said circuit;

(d) said means for improving the fuel includes an aperture along said circuit to expose at least one tube carrying the fuel to a gas.

19. The hydrocarbon fuel improvement system of claim 18 wherein said aperture exposes the fuel to ambient air.

20. The hydrocarbon fuel improvement system of claim 18 wherein said aperture is connected to a gas inlet port along a narrowing of the fuel flow within said circuit.

* * * * *